Patented Dec. 21, 1937

2,102,595

UNITED STATES PATENT OFFICE 2,102,595

COATING COMPOSITION AND METHOD OF MAKING THE SAME

Maurice V. Hitt, Wilmington, Del., and David G. Kennedy and Harry L. Priddy, Parlin, N. J., assignors to E. I. du Pont de Nemours & Company, Wilmington, Del., a corporation of Delaware No Drawing. Application May 8, 1935, Serial No. 20,394

6 Claims. (Cl. 134—79)

This invention relates to an improved process for manufacturing cellulose derivative coating compositions, and more particularly to a process for dispersing pigments in nitrocellulose vehicles by means of a kneading operation.

Numerous mechanical devices have been used in the past to disperse pigments in cellulose derivative vehicles. Early conventional methods included the use of the buhrstone mill, the ball mill and the three roller mill. It was also found practicable to disperse the softer type pigments by means of the well known rubber mill consisting essentially of two heavy steel rolls, which are adjustable and which usually are made to turn at differential speeds. More recently, machines which provide kneading action on a composition of consistency intermediate between the operating consistencies of the vehicle utilized for the buhrstone, ball and three roller mill and the solid colloid used in the rubber rolls process have found favor in the industry. The adoption of this later type of equipment for dispersing pigments, while affording several economic and quality advantages, also presents certain obstacles to the immediate and unstudied adoption of a method for satisfactory operation with this equipment. One of the most difficult problems encountered, particularly in connection with the heavy duty type of kneading equipment, which is designed for operating under unusually high consistency of vehicle, was that of fire and explosion hazards. Obviously, this factor is a serious menace in any manufacturing procedure and when the hazard exists, it is decidedly hindering to the general adoption and best development of the process, regardless of other advantages which may accrue therefrom. Other devices have been described which minimize the fire hazard, but in producing this beneficial effect they employ such a large ratio of solvent or diluents to nitrocellulose or such a large percentage of active solvent in the solvent-diluent composition that the resulting composition is incapable when subsequently used in the presence of black pigments, notably carbon black, of dispersing the same uniformly in such a manner as to obtain enamels of a satisfactory color tone, gloss and grit content; although suitable for some pigments. The resulting enamel should display an intensity of coloration and a degree of purity of color tone which, while difficult to describe, is recognizable at once by color experts. These effects can only be obtained when the dispersed black pigments are in an exceedingly fine uniformly dispersed condition. None of the prior art disclosures produced this desired type of dispersion while at the same time maintaining the nitrocellulose in the condition of safety described above.

The present invention, therefore, aims to provide a practical procedure which permits the use of heavy duty kneading type equipment with greatly reduced fire and explosion hazard, without detracting from economic and quality advantages normally secured in manufacturing cellulose derivative enamels in this type of equipment.

A further object is the provision of a kneading process for dispersing pigments in nitrocellulose compositions whereby the rate of burning of the nitrocellulose mixtures is reduced to a minimum consistent with effective dispersion of pigments.

A still further object is the provision of a process for dispersing pigments or other coloring matter in nitrocellulose vehicles by kneading the pigment or coloring matter with the dispersing medium under such conditions that no dry pigment or dry nitrocellulose may be blown out of the kneading machine to create a condition that might result in dust explosion.

A further object is the provision of a kneading process for dispersing pigments in nitrocellulose vehicles which places the nitrocellulose in such physical state as to counteract a hazardous condition which would otherwise be created because of the tendency of certain pigments to absorb the wetting liquid on the nitrocellulose and leave it in a dry and, therefore, dangerous condition.

A still further object is the provision of a kneading process for dispersing pigments in nitrocellulose vehicles which simplifies operating procedure for the manufacture of pigmented enamels.

Other objects will become apparent as the description of the invention proceeds.

These objects are accomplished by kneading the pigments and/or other coloring matter with a previously prepared composition, which consists of a cellulose derivative which has been wetted and swelled with a mixture of a suitable solvent and diluent.

We are aware that nitrocellulose has been completely colloided and maintained at a consistency which will disrupt the softer pigment agglomerates when kneaded, but we prefer to provide a grinding vehicle of such character that pigments may be satisfactorily dispersed in a heavy type kneading machine such as the Banbury mixer.

Other processes provide for the kneading of pigment with fibrous nitrocellulose which is wet with alcohol or other similar liquid. This method, however, is subject to the hazardous conditions noted above since many pigments are quite absorptive and will absorb the liquid from the nitrocellulose fibres, leaving it in a dry state and, therefore, inherently industrially unsafe.

The present invention provides for a pretreatment of the nitrocellulose with solvents and diluents in such proportions that the nitrocellulose is swelled and softened and becomes friable and non-sticky, so that the tumbling or kneading treatment which is carried out in the presence of these liquids causes material reduction in particle size of the nitrocellulose. The resulting product does not "flash" upon ignition as does the untreated nitrocellulose, but burns with a smoky flame at a comparatively slow rate, thus materially improving the industrial safety of the process.

In pre-treating the nitrocellulose the composition of the solvents and/or diluents, and the treatment must be such that particles of the final product can be divided to form a friable powdery mass which will not coalesce except under high pressure and/or heat. The distinctive properties of this product are that it has no cohesive force, is friable, and breaks readily into small particles the surfaces of which are not sticky.

The following specific examples are given by way of illustration only and it will be understood that they do not limit the scope of the invention except as indicated in the appended claims.

EXAMPLE 1

*Intermediate A—Prepared by tumbling treatment*

| | Per cent |
|---|---|
| Nitrocellulose (½ second viscosity) (nitrated regenerated cellulose) | 66.7 |
| Ethyl alcohol (denatured) | 16.3 |
| Toluol | 12.8 |
| Isobutyl acetate | 2.6 |
| Ethyl acetate | 1.6 |
| | 100.0 |

Two hundred and sixty-seven pounds of this mixture were placed in a 55 gallon open head steel barrel, preferably first mixing the solvents and diluents, in the proportions noted, in a separate container. The barrel was closed and placed on a rolling device, geared to rotate the barrel at approximately one revolution per minute. In order that the desired results be secured it is preferred to carry out this operation in a heated room during the colder seasons of the year.

The time required to form the desired intermediate will vary somewhat, depending upon several conditions, such as the specific type of nitrocellulose used, temperature employed, composition of the solvent-diluent mixture, and proportions existing between solvent-diluent, and nitrocellulose. A maximum tumbling cycle of 56 hours is sufficient for most cases, although we do not limit the time to 56 hours. In any event, it is desired to thoroughly wet and swell the nitrocellulose, which results are accomplished by the solvents and diluents present in the mixture.

EXAMPLE 2

*Intermediate A—Prepared by kneading treatment*

An alternative procedure which is oftentimes preferred provides for the preparation of this intermediate product by working in a suitable kneading machine such as a Werner & Pfleiderer mixer. Using the same ingredient ratios as shown in Example 1, 306 pounds of the mixture were placed in the kneading machine, preferably, however, first mixing the several solvents and diluents in a separate container and adding them to the nitrocellulose as a unit. As in the tumbling operation, the time of kneading varies with the type of nitrocellulose used. For nitrated regenerated cellulose, a satisfactory product may be prepared in about 30 minutes treatment, whereas for the more difficultly pulverized smokeless powder type of nitrocellulose, from one to two hours are required.

EXAMPLE 3

*Intermediate B*

| | Per cent |
|---|---|
| Intermediate A | 81.0 |
| Amyl alcohol | 11.0 |
| Carbon black | 7.0 |
| Nigrosine | 1.0 |
| | 100.0 |

It has been found expedient to previously wet the pigment and nigrosine with a suitable liquid such as amyl alcohol. Intermediate A and the previously wetted coloring matter are charged into a heavy duty kneading machine and the mixture kneaded until satisfactory dispersion is obtained as evidenced by good gloss, color, and absence of grit when made up into the final enamel.

When the pigment has been dispersed to a satisfactory degree, the charge is transferred to an ordinary agitator type mixer where the additional ingredients in proper proportions, such as solvents, diluents, resins, plasticizers, softeners, etc., are added and mixing continued until the ingredients are thoroughly and uniformly mixed to provide a commercially acceptable nitrocellulose enamel. The Intermediate B product is conveniently handled in plant scale operations because of its friable nature. It is also readily dispersed in the solvents which are added in the agitator mixer and is quickly and uniformly mixed with the remaining ingredients.

An alternative procedure provides for the inclusion of the amyl alcohol in the preparation of the Intermediate A, the coloring matter being added directly in the dry state as disclosed in Example 6 below.

EXAMPLE 4

*Intermediate A—Prepared by either method as shown in Examples 1 and 2*

| | Per cent by weight |
|---|---|
| Nitrocellulose (½ second viscosity—smokeless powder type) | 65.0 |
| Ethyl alcohol | 16.5 |
| Toluol | 7.3 |
| Ethyl acetate | 1.5 |
| Isobutyl acetate | 2.4 |
| Amyl alcohol | 7.3 |
| | 100.0 |

This intermediate was successfully utilized in preparing enamels containing iron oxide and ferrite yellow pigment as follows:

EXAMPLE 5

*Intermediate B—Iron oxide*

| | Per cent by weight |
|---|---|
| Iron oxide | 29.8 |
| Intermediate A (Example 4) | 67.8 |
| Isobutyl acetate | 2.4 |
| | 100.0 |

Example 6

Intermediate B—Ferrite yellow

| | Per cent by weight |
|---|---|
| Ferrite yellow | 30.0 |
| Intermediate A (Example 4) | 70.0 |
| | 100.0 |

The Intermediate B compositions of Examples 5 and 6 are kneaded for approximately 30 minutes or until satisfactory dispersion of the pigment has been accomplished. The final enamels are manufactured from the kneaded Intermediate B products in the same manner as that described in Example 3.

In kneading the pigment with the Intermediate A product, it has been found advantageous to absorb the heat produced from working the mass by water cooling the machine so as to maintain a uniform temperature throughout the mass of about 80° C.

The composition of the Intermediate A product may, of course, be prepared from other commonly available solvents and diluents but in any event care should be taken that the ratio of active nitrocellulose solvents to diluents be controlled so that uniform wetting and swelling of the nitrocellulose will occur. The resulting product should also be friable and materially reduced in particle size from the tumbling or kneading treatment as applied to the wetted and swollen nitrocellulose.

The improved process may be employed with many of the commonly available pigments such as zinc oxide, lithopone, titanium oxide, China clay, antimony oxide, burnt umber, ochre, paratoner, toluidine toner, etc., although in the case of the harder type pigments, it may be necessary to resort to some common means of clarification such as centrifuging or filtration to remove any agglomerates which are not destroyed by the kneading action of the process. Our process is particularly adapted to the dispersion of carbon blacks which have always been difficult to disperse uniformly.

Nitrocellulose in the form of nitrated regenerated cellulose and nitrocellulose of the smokeless powder type are indicated as base materials in the specific examples described above. However, other types of nitrocellulose such as nitrated cotton linters, nitrated wood pulp, either in "fluff" form or dense type, nitrated paper, film scrap and similar materials, etc., are likewise suited for use in the present invention.

The time required for acceptable dispersion of any given pigment will vary depending upon the particular pigment to be dispersed, the efficiency of the kneading equipment, the temperature maintained, etc., but in general kneading cycles for from 3 minutes to 30 minutes have accomplished the desired results.

The viscosity of the nitrocellulose is not critical but we prefer to use from ¼ to 25 sec. Hercules. For the higher viscosity nitrocelluloses the kneading should be extended; however, this can be reduced by adding more wetting and swelling liquids. However, we perfer to vary the ratio of cellulose derivative to vehicle in Intermediate A within limits which will yield a composition which burns at a comparatively slow rate and with a smoky flame but which does not have a large excess of active solvent or diluent.

The amount of pigment to be used depends on the nature of the pigment; as a rule less black pigment is used with a given amount of vehicle than is the case of white pigment.

In place of amyl alcohol for pretreating the pigment we may substitute nearly any of the higher aliphatic alcohols such as propyl or butyl, and certain aromatic compounds such as toluol are suitable.

It is well known that in dispersing pigments in nitrocellulose vehicles in liquid form long grinding periods are necessary. On the other hand very plastic or solid vehicles present other difficulties as mentioned above. It is believed that the solvents and diluents in the proportions indicated thoroughly wet and swell the nitrocellulose and may also otherwise act upon the nitrocellulose in such a manner as to place it in a friable condition and when associated with tumbling or kneading action in this condition, the nitrocellulose becomes materially reduced in particle size.

It is well known in the art that black enamels with real jetness as distinguished from grayish or brownish blacks are more difficult to prepare than probably any other color. In fact, there are very few processes known at the present time by which carbon black may be dispersed easily to obtain a satisfactory degree of jetness. We have found that if nitrocellulose is dispersed as indicated above and the resulting product kneaded in a heavy duty type of apparatus with carbon black, an enamel having a surprising intensity, gloss, and low grit content is obtained.

The invention is of utility in the manufacture of cellulose derivative coating compositions in that the heavy duty type of kneading machine may be used and more particularly in connection with compositions prepared from nitrocellulose where fire and explosion hazards are of more serious moment.

Due to the peculiar effects of the solvent-diluent mixture in the proportions indicated, the nitrocellulose is maintained in such condition as will avoid firing tendencies during the kneading with the pigment. In addition, the absorption tendency of certain pigments for the wetting liquid, thus creating an unsafe condition, is counteracted. Not only does the absence of dryness prevent the propulsion of nitrocellulose or pigment dust through the orifices in the mixing device, but the surface of the nitrocellulose which could be exposed to burning, is so affected that the product does not flash or "puff", but burns with a smoky flame and with comparative slowness. Because of the relatively brittle nature of the pigmented intermediate, it is easily broken up, thereby greatly facilitating final mixing in the agitator mixers where the remaining ingredients of the enamel composition are added. The physical nature of the intermediate, therefore, obviates the need for sheeting the product through rolls, such as rubber rolls, a step required by processes heretofore generally practiced so that the process of the present invention affords obvious operating economies.

The limit to the amount of solvent and diluent present in the nitrocellulose composition is determined by the physical character of the composition which as previously described should be friable, non-sticky, and easily broken up, a condition which is obtained by causing a thorough wetting and swelling of the nitrocellulose. This desired condition can be readily secured for any specific type of nitrocellulose by adjusting the proportions of solvents and diluents. Particular care should be taken to avoid the inclusion of such amounts of active solvent that the nitrocellulose will colloid to a continuous or semicontinuous phase, thereby going beyond the desired friable state.

The process is practical and economical and makes an otherwise unsafe operation, industrially acceptable.

It is apparent that many widely different embodiments of this invention may be made without departing from the spirit and scope thereof and, therefore, it is not intended to be limited except as indicated in the appended claims.

We claim:

1. Process of preparing coating compositions which comprises mixing about two parts of undissolved nitrocellulose and one part of organic liquid consisting of a diluent in major proportion and a volatile solvent in minor proportion for about 30 minutes, mixing therewith about .1 part of carbon black wet with amyl alcohol, kneading until homogeneous and mixing therewith solvent, diluent, and resin.

2. The process of preparing enamels which comprises mixing the following ingredients:

| | Percent |
|---|---|
| Nitrocellulose (½ sec.) | 66.7 |
| Ethyl alcohol (denatured) | 16.3 |
| Toluol | 12.8 |
| Isobutyl acetate | 2.6 |
| Ethyl acetate | 1.6 | when the material is thoroughly mixed adding thereto approximately 11 parts of amyl alcohol and 7 parts of carbon black to about each 81 parts of the nitrocellulose mixture.

3. In the process of preparing coating compositions, the improvement which comprises mixing about 2 parts undissolved nitrocellulose with about 1 part of an organic liquid containing a diluent in major proportion and an active solvent in minor proportion and when homogeneous mixing pigment therewith.

4. An enamel intermediate having approximately the following composition:

| | Percent |
|---|---|
| Nitrocellulose (low viscosity) | 65.0 |
| Alcohol | 16.5 |
| Toluol | 7.3 |
| Ethyl acetate | 1.5 |
| Isobutyl acetate | 2.4 |
| Amyl alcohol | 7.3 |

5. The process which comprises mixing a pigment with a swelled, friable, undissolved cellulose derivative having approximately the texture of the intermediate of claim 4.

6. The process which comprises mixing a pigment wet with an organic liquid with a swelled, friable, undissolved cellulose derivative having approximately the texture of the intermediate of claim 4.

MAURICE V. HITT.
DAVID G. KENNEDY.
HARRY L. PRIDDY.